US007753821B2

(12) United States Patent
Ueda et al.

(10) Patent No.: US 7,753,821 B2
(45) Date of Patent: Jul. 13, 2010

(54) POWER TRANSMISSION DEVICE (75) Inventors: Yasushi Ueda, Toyota (JP); Toshiharu Hirai, Toyota (JP); Atsushi Kawamoto, Toyoya (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 519 days.

(21) Appl. No.: 11/709,032

(22) Filed: Feb. 22, 2007

(65) Prior Publication Data

US 2007/0207887 A1  Sep. 6, 2007

(30) Foreign Application Priority Data

Mar. 3, 2006  (JP) .............................. 2006-058581

(51) Int. Cl.
*F16H 57/08* (2006.01)
(52) U.S. Cl. ...................................... 475/331
(58) Field of Classification Search ................. 475/177, 475/331, 346
See application file for complete search history.

(56) References Cited

U.S. PATENT DOCUMENTS

| 4,178,814 A | * | 12/1979 | Ahlen ......................... 475/142 |
| 4,459,869 A | * | 7/1984 | Bucksch ....................... 74/467 |
| 4,646,880 A | * | 3/1987 | Logan ....................... 188/18 A |
| 4,825,726 A |   | 5/1989 | Schofield |
| 5,006,100 A | * | 4/1991 | Brandt et al. ................ 475/138 |
| 5,655,986 A | * | 8/1997 | Wilson et al. ................ 475/204 |
| 5,997,426 A | * | 12/1999 | Ito et al. ........................ 475/80 |
| 6,067,734 A | * | 5/2000 | Kallenberger ................. 37/395 |
| 6,685,437 B2 | * | 2/2004 | Koenig et al. .................. 417/15 |
| 7,044,883 B2 | * | 5/2006 | Andersson et al. .......... 475/331 |
| 7,357,745 B2 | * | 4/2008 | Hidaka et al. ............... 475/159 |
| 7,419,454 B2 | * | 9/2008 | Shimizu ..................... 475/331 |
| 7,479,084 B2 | * | 1/2009 | Alfredsson .................. 475/209 |

FOREIGN PATENT DOCUMENTS

| JP | 5289566 | 7/1977 |
| JP | 05026303 A | 2/1993 |
| JP | 06117502 A | 4/1994 |
| JP | 07012180 A | 1/1995 |
| JP | 7-65657 B2 | 7/1995 |
| JP | 2005-240924 A | 9/2005 |

OTHER PUBLICATIONS

Japanese Office Action dated Nov. 4, 2009.

* cited by examiner

*Primary Examiner*—Ha D. Ho
(74) *Attorney, Agent, or Firm*—Sughrue Mion, PLLC (57) ABSTRACT A composite gear member of the power transmission device is divided into an annular first member and a second member. The annular first member is formed with an output gear. The second member is formed with internal teeth and spline-coupled to an inner portion of the first member. Therefore, the influence of the engagement reaction force generated from the output gear of the first member is decreased by the spline-coupling, and the vibration is reduced.

13 Claims, 8 Drawing Sheets

22: FIRST PLANETARY GEAR DEVICE
24: SECOND PLANETARY GEAR DEVICE
32: OUTPUT GEAR (EXTERNAL TEETH)   42: COMPOSITE GEAR MEMBER
44: FIRST MEMBER (MAIN BODY)   46: SECOND MEMBER (ANNULAR MEMBER)
52: INTERNAL TEETH OF MAIN BODY   58: INTERNAL TEEEH

22: FIRST PLANETARY GEAR DEVICE
24: SECOND PLANETARY GEAR DEVICE
32: OUTPUT GEAR (EXTERNAL TEETH)    42: COMPOSITE GEAR MEMBER
44: FIRST MEMBER (MAIN BODY)   46: SECOND MEMBER (ANNULAR MEMBER)
52: INTERNAL TEETH OF MAIN BODY   58: INTERNAL TEETH

POWER TRANSMISSION DEVICE

INCORPORATION BY REFERENCE

The disclosure of Japanese Patent Application No. 2006-058581 filed on Mar. 3, 2006 including the specification, drawings and abstract is incorporated herein by reference in its entirety.

BACKGROUND OF THE INVENTION

1. Field of the Invention

The present invention relates to a power transmission device mounted to a vehicle, and more particularly to a power transmission device that reduces vibration generated from a composite gear member including internal teeth engaged with a pinion gear of a planetary gear device, in order to function as a ring gear of the planetary gear device, and external teeth engaged with another gear.

2. Description of Related Art

As one example of a power transmission device mounted to a vehicle, there is a power transmission device which is provided with a composite gear member including internal teeth engaged with the pinion gear of a planetary gear device, in order to function as a ring gear of the planetary gear device, and external teeth engaged with another gear. A ring gear of such a planetary gear device is described in Japanese Patent Publication No. JP-B2-7-65657 (see reference numeral 13 in FIG. 2 of Japanese Patent Publication No. JP-B2-7-65657).

In general, a planetary gear device comprises a sun gear, a ring gear and a plurality of pinion gears disposed between the sun gear and the ring gear. The pinion gears are arranged equiangularly with each other. When the planetary gear device is driven, an engagement reaction force is generated from contact portions between the engaged teeth of the gears. Because the engagement reaction force is equally exerted on the respective pinion gears, it was known that eccentricity of the planetary gear device is automatically reduced by the engagement reaction force, That is, a so-called aligning operation occurs.

However, in the power transmission device disclosed in Japanese Patent Publication No. JP-B2-7-65657, which is provided with the composite gear member including the external teeth engaged with another gear, in addition to the engagement reaction force generated in the planetary gear device, an additional engagement reaction force is generated from the external teeth engaged with the other gear of the composite gear member. Consequently, there is a problem that, by the engagement reaction force generated from the external teeth, the balance of the engagement reaction force in the planetary gear device may not be maintained. Thus, vibrations are easily induced.

SUMMARY OF THE INVENTION

The present invention provides a power transmission device which reduces vibration generated from a composite gear member including internal teeth engaged with a pinion gear of a planetary gear device and external teeth engaged with other gear, by decreasing influence of an engagement reaction force generated by the engagement of the external teeth.

In a power transmission device according to a first aspect of the invention, the power transmission device includes a composite gear member having internal teeth engaged with pinion gears of a planetary gear device, in order to function as a ring gear of the planetary gear device, and external teeth engaged with other gear, wherein the composite gear member includes a cylindrical main body that is formed with the external teeth, and an annular member that is formed with the internal teeth and spline-coupled to an inner portion of the main body.

According to the first aspect of the invention, the composite gear member is divided into a cylindrical main body that is formed with the external teeth, and an annular member that is formed with the internal teeth and spline-coupled to the inner portion of the main body, an influence of an engagement reaction force generated from the external teeth of the main body can be decreased by the spline-coupling. Thus, vibrations are reduced.

In accordance with the first aspect of the invention, the annular member may be spline-coupled to the main body such that the tooth surfaces of the spline teeth formed on the inner portion of the main body come into contact with the tooth surfaces of the spline teeth formed on an outer peripheral surface of the annular member.

According to this aspect, the annular member is spline-coupled to the main body such that tooth surfaces of spline teeth formed at the inner portion of the main body come into contact with tooth surfaces of spline teeth formed at an outer peripheral surface of the annular member, sufficient clearances are provided between tooth tips and tooth bottoms of the spline teeth of the main body and the annular member. Therefore, the influence of the engagement reaction force generated from the external teeth of the main body can be further decreased, and the vibration can be reduced.

In accordance with the first aspect of the invention, the main body may be provided with internal teeth of the main body engaged with a pinion gear of another planetary gear device that is mounted near the planetary gear device in an axial direction, and the internal teeth of main body may have a smaller diameter than the internal teeth formed at the annular member.

According to the this aspect, the internal teeth of the main body are engaged with the pinion gears of another planetary gear device that is mounted near the planetary gear device in an axial direction. The addendum circle of the internal teeth of the main body has a smaller diameter than that of the internal teeth formed on the annular member, the internal teeth of the annular member and the internal teeth of the main body are formed by broaching, which has good machining accuracy and efficiency, and because of the increased machining accuracy vibrations are reduced.

In accordance with the above aspects, the external teeth may be positioned between the internal teeth formed on the annular member and the internal teeth of main body in the axial direction.

According to this aspect, the external teeth are positioned between the internal teeth formed at the annular member and the internal teeth of main body in the axial direction, the engagement reaction force generated from the external teeth is dispersed into the respective planetary gear devices, and the influence of the engagement reaction force from the external teeth is decreased.

In a power transmission device according to a second aspect of the invention, the power transmission device includes first and second planetary gear devices. Each of the first and the second planetary gear devices has one group of pinion gears. The power transmission device comprises a common composite gear member including first and second internal teeth that engage with the pinion gears of the first and second planetary gear devices, thereby functioning as ring gears of the first and second planetary gear devices, and external teeth that engage with another gear. The composite gear member includes: a cylindrical main body that is formed with the external teeth and the first internal teeth that engage with the pinion gear of the first planetary gear device; and an annular member that is spline-coupled to an inner portion of the main body, and that is formed with the second internal teeth that engage with the pinion gear of the second planetary gear device.

In accordance with the second aspect of the invention, the external teeth may be positioned between the first internal teeth and the second internal teeth in the axial direction of the main body.

BRIEF DESCRIPTION OF THE DRAWINGS

The above and other objects and features of the present invention will become apparent from the following description of preferred embodiment, given in conjunction with the accompanying drawings, in which.

DETAILED DESCRIPTION OF THE PREFERRED EMBODIMENTS

Various embodiment of the present invention will now be described in detail with reference to the accompany drawings.

Figure 1:
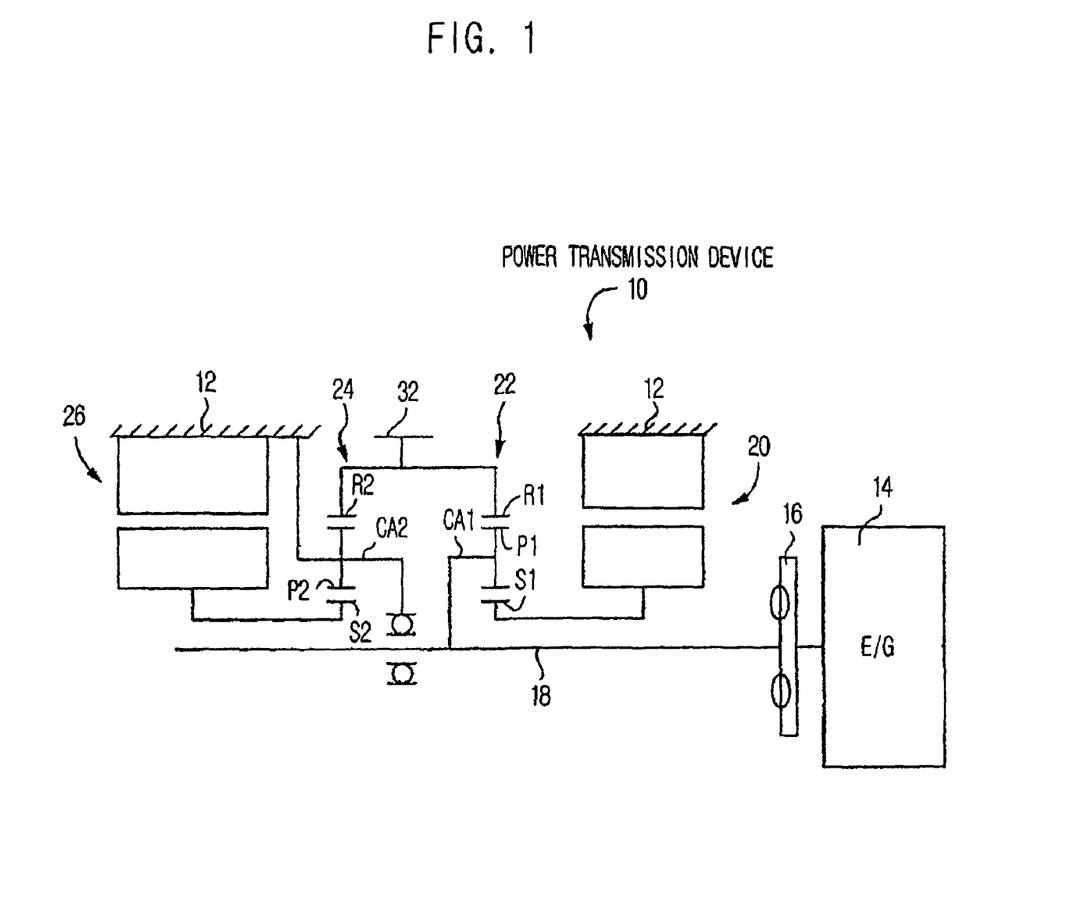
FIG. 1 is schematic view illustrating a power transmission device employed in a hybrid vehicle in accordance with the present invention.

FIG. 1 is schematic view illustrating a power transmission device 10 in accordance with an embodiment of the present invention employed in a hybrid vehicle. As shown in FIG. 1, a power transmission device 10 is mounted in a housing case 12 (hereinafter, which will be called a case 12), a non-rotating member, which is installed to a car body. The power transmission device 10 comprises a damper 16 which absorbs vibration caused by torque variation from an engine 14, an input shaft 18 which is rotated by the engine 14 via the damper 16, a first motor 20, a planetary gear device 22 that functions as a power distribution device, another planetary gear device 24 that functions as a speed reduction device, and a second motor 26. The above elements from the damper 16 to the second motor 26 of the power transmission device 10 are sequentially arranged from the engine 14. Hereinafter, for the sake of convenience, two planetary gear devices 22 and 24 is referred respectively as a first planetary gear device 22 and a second planetary gear device 24.

Such a power transmission device 10 is suitable for use in a FF (Front engine Front drive) type vehicle, in which the power transmission device 10 is transversely installed. Output from the engine 14 is transferred to the driving wheels via a counter gear (not shown) and a differential gear system (not shown). Also, because the power transmission device 10 is configured substantially symmetrically with respect to the center of the shaft, the illustration of a lower-half part of the power transmission device 10 is omitted in FIG. 1.

The engine 14 rotates the input shaft 18, which is connected at one end to the engine 14 via the damper 16. The first planetary gear device 22 functions as the power distribution device, which mechanically distributes the output, transmitted from the engine 14 to the input shaft 18, respectively, to the first motor 20 and an output gear 32. The first motor 20 and the second motor 26 in this embodiment are a so-called motor generator having a function of electricity generation. The first motor 20 has at least a function of a generator for generating a reaction force, and the second motor 26 has at least a function of a motor for outputting a driving force.

The first planetary gear device 22 is a single pinion type planetary gear device which functions as the power distribution device. The first planetary gear device 22 has rotating elements including a sun gear S1, a pinion gear P1, a carrier CA1 which supports the pinion gear P1 to rotate and revolve, and a ring gear R1 which is tooth-engaged with the sun gear S1 via the pinion gear P1. The second planetary gear device 24 is a single pinion type planetary gear device, which functions as the speed reduction device. The second planetary gear device 24 has rotating elements including a sun gear S2, a pinion gear P2, a carrier CA2, which supports the pinion gear P2 to rotate and revolve, and a ring gear R2, which is tooth-engaged with the sun gear S2 via the pinion gear P2. The ring gear R1 of the first planetary gear device 22 and the ring gear R2 of the second planetary gear device 24 are an integrated composite gear, and an output gear 32, which functions as an output element, is provided with an outer peripheral surface of the composite gear.

In the first planetary gear device 22, the carrier CA1 is connected to the input shaft 18, the sun gear S1 is connected to the first motor 20, and the ring gear R1 is connected to the output gear 32. Accordingly, because the sun gear S1, the carrier CA1 and the ring gear R1 can respectively rotate relative to each other, the output from the engine 14 is distributed to the first motor 20 and the output gear 32. The first motor 20 generates electricity using the output from the engine 14 distributed to the first motor 20, and the second motor 26 is rotated by the generated electric energy and the accumulated electric energy. Therefore, there becomes a continuously variable transmission state, for example, and the rotation of the output gear 32 continuously varies regardless of the rotation of the engine 14.

In the second planetary gear device 24, the carrier CA2 is connected to the case 12, which is a non-rotating member, whereby the rotation of the carrier CA2 is prohibited, the sun gear S2 is connected to the second motor 26, and the ring gear R2 is connected to the output gear 32. Accordingly, when starting, for example, the second motor 26 is driven to rotate, whereby the sun gear S2 is rotated, and a rate of the rotation is decreased by the second planetary gear device 24 and is transmitted to the output gear 32.

Figure 2:
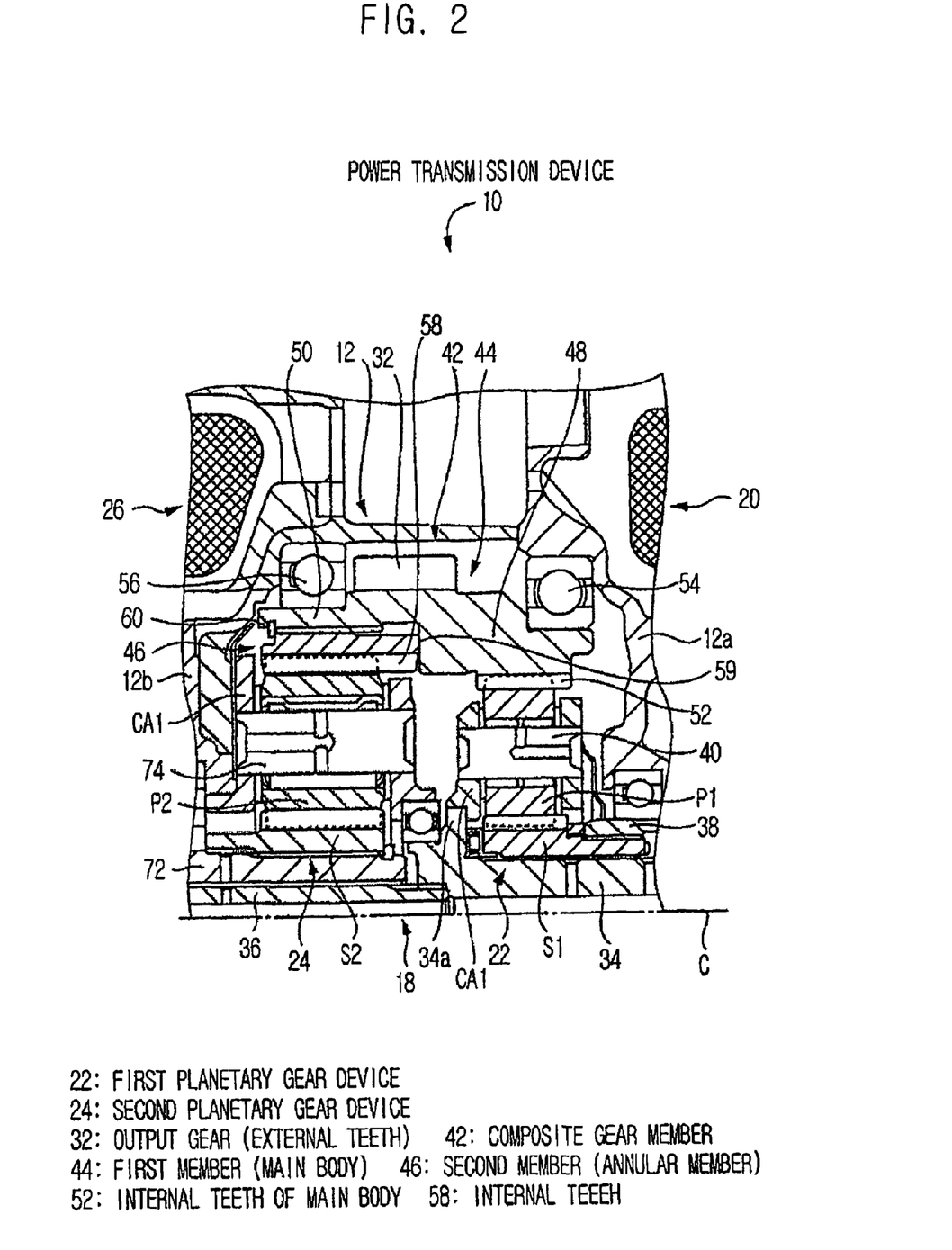
FIG. 2 is a sectional view showing a constitution of a part of a power transmission device according to the present invention depicted in FIG. 1.

FIG. 2 is a sectional view showing a constitution of a part of the power transmission device 10 according to the present invention depicted in FIG. 1. Because the power transmission device 10 is structured substantially symmetrically with respect to a center C of the shaft, the illustration of a lower-half part of the power transmission device 10 is omitted.

As shown in FIG. 2, the first planetary gear device 22 and the second planetary gear device 24 are adjacently mounted in the axial direction between the first motor 20 and the second motor 26. The input shaft 18 consists of a first input shaft 34 on a side of the first motor 20 and a second input shaft 36 on a side of the second motor 26. The opposing ends of the first input shaft 34 and the second input shaft 36, are spline-coupled so that the first and second input shafts 34 and 36 are integrally rotated by the rotation of the engine 14.

A collar 34a protrudes in a radial direction from the end of the first input shaft 34 that is adjacent to the second input shaft 36, and the carrier CA1 of the first planetary gear device 22 is welded to the outer circumference of the collar 34a. The sun gear S1 of the first planetary gear device 22 is coupled to the first input shaft 34 such that the inner peripheral surface can rotate relatively to an outer peripheral surface of the first input shaft 34, and is formed with external teeth at the outer circumference. Furthermore, the sun gear S1 is spline-coupled to the rotor member 38 which functions as a rotor of the first motor 20. The carrier CA1 supports a carrier pin 40, and the pinion gear P1 is rotatably supported by the carrier pin 40. The pinion gear P1 meshes with the sun gear S1 at its inner portion in the radial direction, and meshes with the internal teeth 52 of the ring gear R1 provided to a composite gear member 42, which will be described later, at its outer portion in the radial direction.

The composite gear member 42 has a cylindrical first member 44 and a second member 46. The cylindrical first member 44 is provided with internal teeth 52 that engage the pinion gear P1 of the first planetary gear device 22, at the inner peripheral surface of the cylindrical first member, to function as the ring gear R1 of the first planetary gear device 22. The second member 46 is provided with internal teeth 58, that engage the pinion gear P2 of the second planetary gear device 24, at the inner peripheral surface of the second member, to function as the ring gear R2 of the second planetary gear device 24. The inner circumference of the first member 44 is formed in a step shape, which includes a small-diameter portion 48 where the inner diameter is relatively small and a large-diameter portion 50 where the inner diameter is relatively large. The small-diameter portion 48 functions as the ring gear R1 of the first planetary gear device 22, and is provided with internal teeth 52 of the ring gear R1, which are engaged with the pinion gear P1. Also, the output gear 32 is formed at the outer peripheral surface of the first member 44, which functions as the output member and meshes with the other gear. The output gear 32 is positioned between the internal teeth 52 formed on the first member 44 and the internal teeth 58 formed on the second member 46 in the axial direction. A ball bearing 54, which is supported by a case wall 12a of a case 12, is coupled to the outer circumference of the first member 44 near the first motor 20. A ball bearing 56, which is supported by a case wall 12b of the case 12, is coupled to the outer circumference of the first member 44 near the second motor 26. By these two ball bearings 54 and 56, the first member 44 can rotate, but cannot move in the axial direction. The composite gear member 42 in this embodiment corresponds to the composite gear member of the present invention, the first member 44 corresponds to the main body of the present invention, the second member 46 corresponds to the annular member of the present invention, the output gear 32 corresponds to the external teeth of the present invention.

The second member 46 functions as the ring gear R2 of the second planetary gear device 24, and is provided with the internal teeth 58 of the ring gear R2, which meshes with the pinion gear P2, at its inner circumference. The second member 46 is axially-movably spline-coupled to the inner circumference of the large-diameter portion 50 of the first member 44. An end of the second member 46 near the first motor 20 contacts the stepped surface 59 of the first member 44, and the other end near the second motor 26 is prohibited from moving in the axial direction by a snap ring 60 that is fitted in the inner circumference of the large-diameter portion 50. The diameter of the addendum circle of the internal teeth 52 of the first member 44 is smaller than that of the internal teeth 58 of the second member 46. Because the second member 46 is independently formed and does not have a stepped portion, the internal teeth 58 of the ring gear R2 can be formed by broaching, which has relatively good machining accuracy and efficiency. Actually, the internal teeth 58 of the ring gear R2 in this embodiment are formed by the broaching. Also, in forming the internal teeth 52 of the first member 44, because the internal teeth 52 are formed where the inner diameter is smallest, the internal teeth 52 may also be formed by broaching. Actually, the internal teeth 52 in this embodiment are formed by the broaching.

Figure 3:
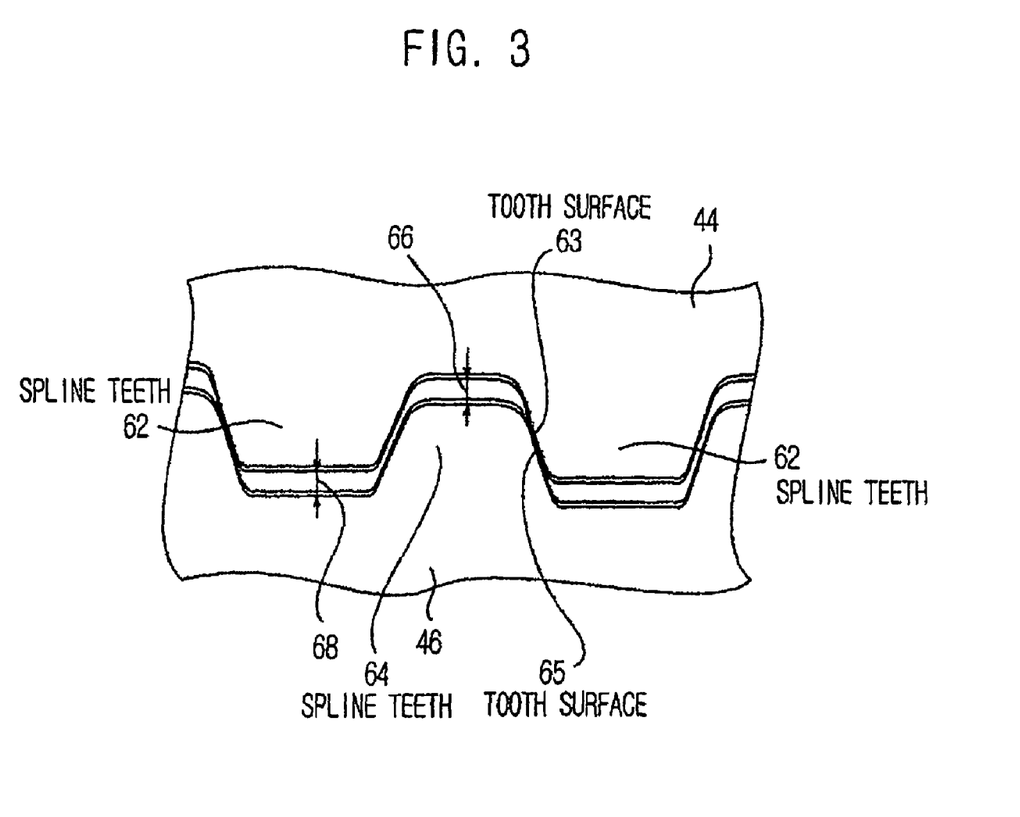
FIG. 3 is an enlarged sectional view showing an engaged portion between a first member and a second member depicted in FIG. 2.

FIG. 3 is an enlarged sectional view showing the meshed portion between the first member 44 and the second member 46. An upper portion in FIG. 3 illustrates spline teeth 62 formed on the inner portion of the first member 44, and a lower portion in FIG. 3 illustrates spline teeth 64 formed on the outer peripheral surface of the second member 46. The spline teeth 62 and 64 of the first and second members 44 and 46 are, respectively, illustrated by double lines, which show upper limit values and lower limit values by tolerance of the spline teeth 62 and 64. In other words, the size of the spline teeth 62 and 64 changes within the range of the dual-line. As shown in FIG. 3, a large-diameter clearance 66, located at the large-diameter portion, and a small-diameter clearance 68, located at the small-diameter portion, have a sufficiently large value in comparison with the tolerance. Accordingly, the first member 44 and the second member 46 are meshed in such a manner that the tooth-surfaces 63 of the spline teeth 62 and tooth-surfaces 65 of the spline teeth 64 come into contact with each other so as to form the large-diameter clearance 66 and the small-diameter clearance 68.

Referring again to FIG. 2, the sun gear S2 of the second planetary gear device 24 is spline-coupled to a rotor member 72 of the second motor 26 at the inner peripheral surface, whereby the sun gear S2 cannot rotate relative to the rotor member 72 of the second motor 26. The carrier CA2 is connected to the case wall 12b of the housing case 12 so that the carrier does not rotate against the housing case 12. The carrier CA2 supports a carrier pin 74, and the pinion gear P2 is rotatably supported by the carrier pin 74. The pinion gear P2 is meshed with the sun gear S2 at the inner portion in the radial direction, and meshed with the internal teeth 58 of the ring gear R2, which is the second member 46, at the outer portion in the radial direction.

Figure 4:
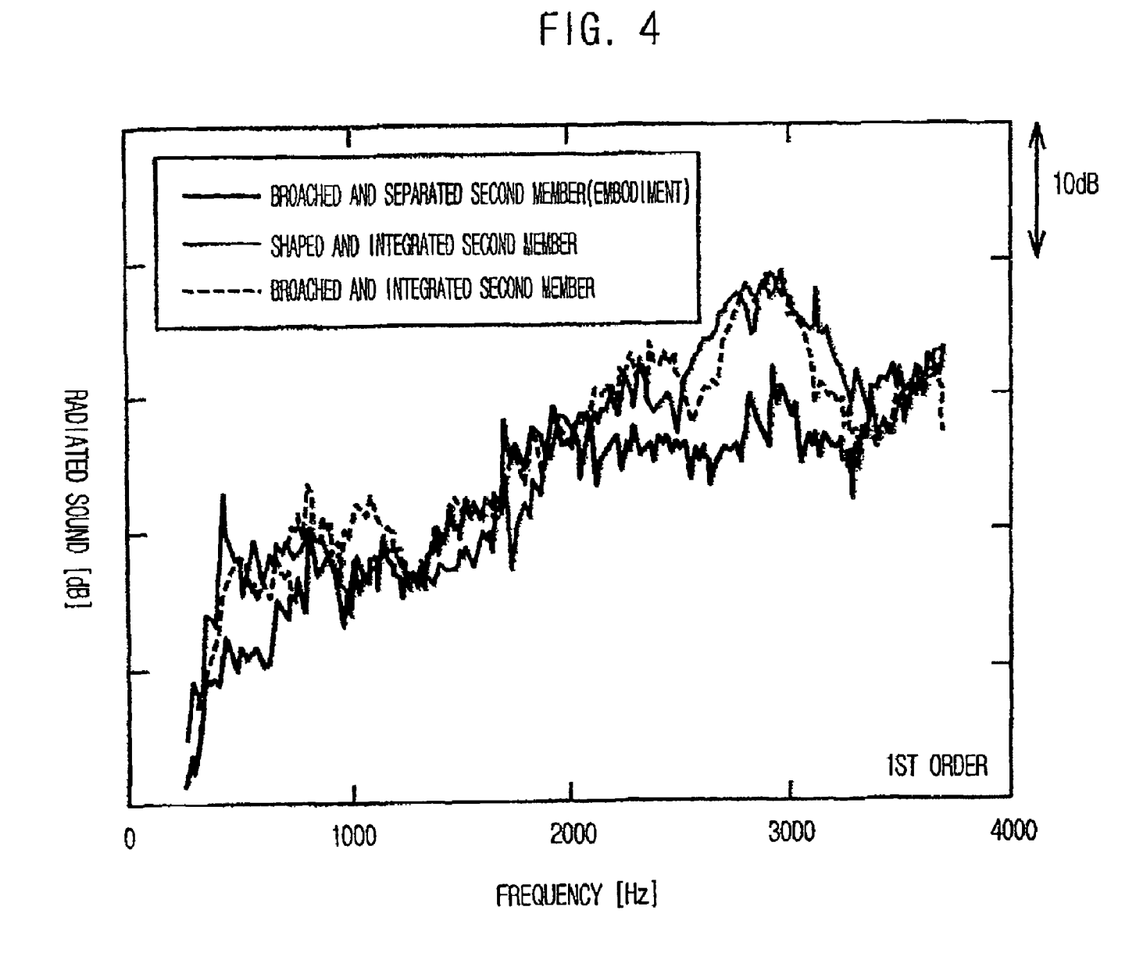
FIG. 4 is a test result of measuring an intensity of radiated sound (vibration noise) by using a microphone when driving a power transmission device.
Figure 5:
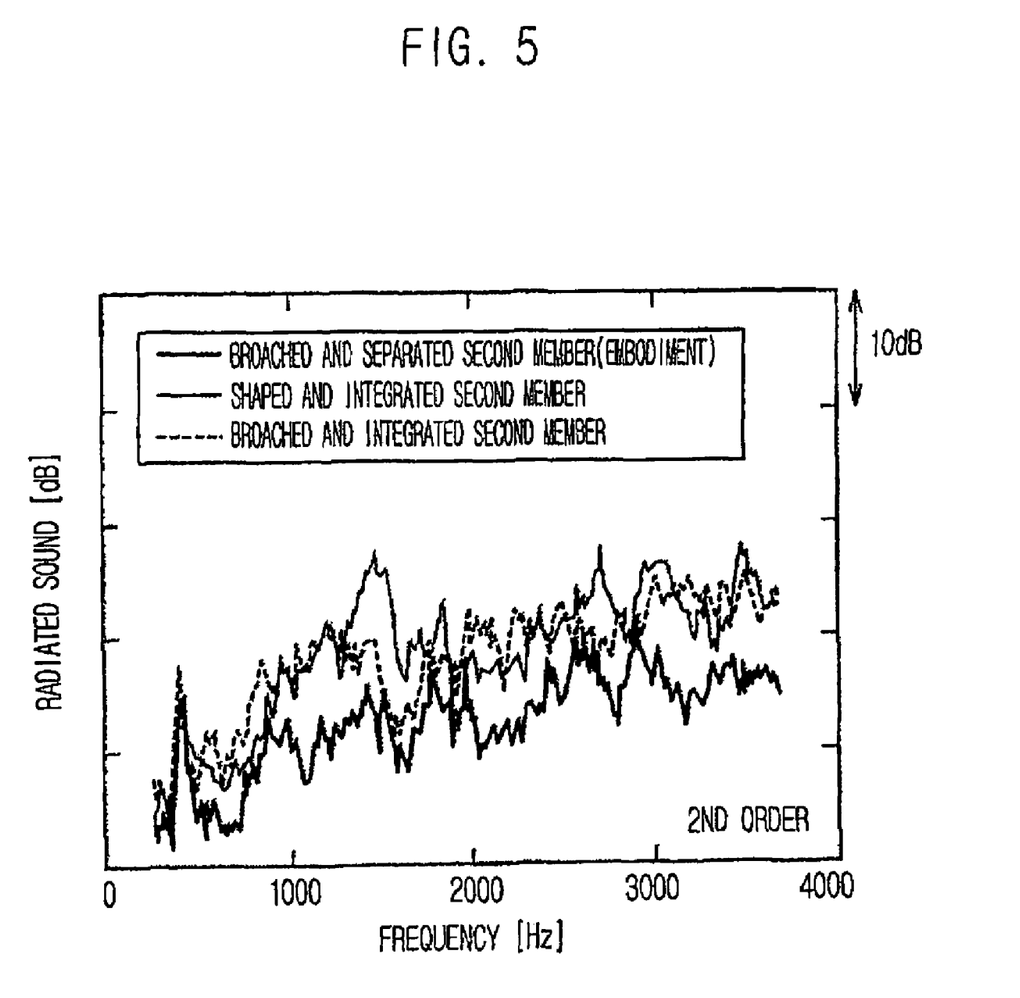
FIG. 5 is another test result of measuring an intensity of radiated sound (vibration noise) by using a microphone when driving a power transmission device.
Figure 6:
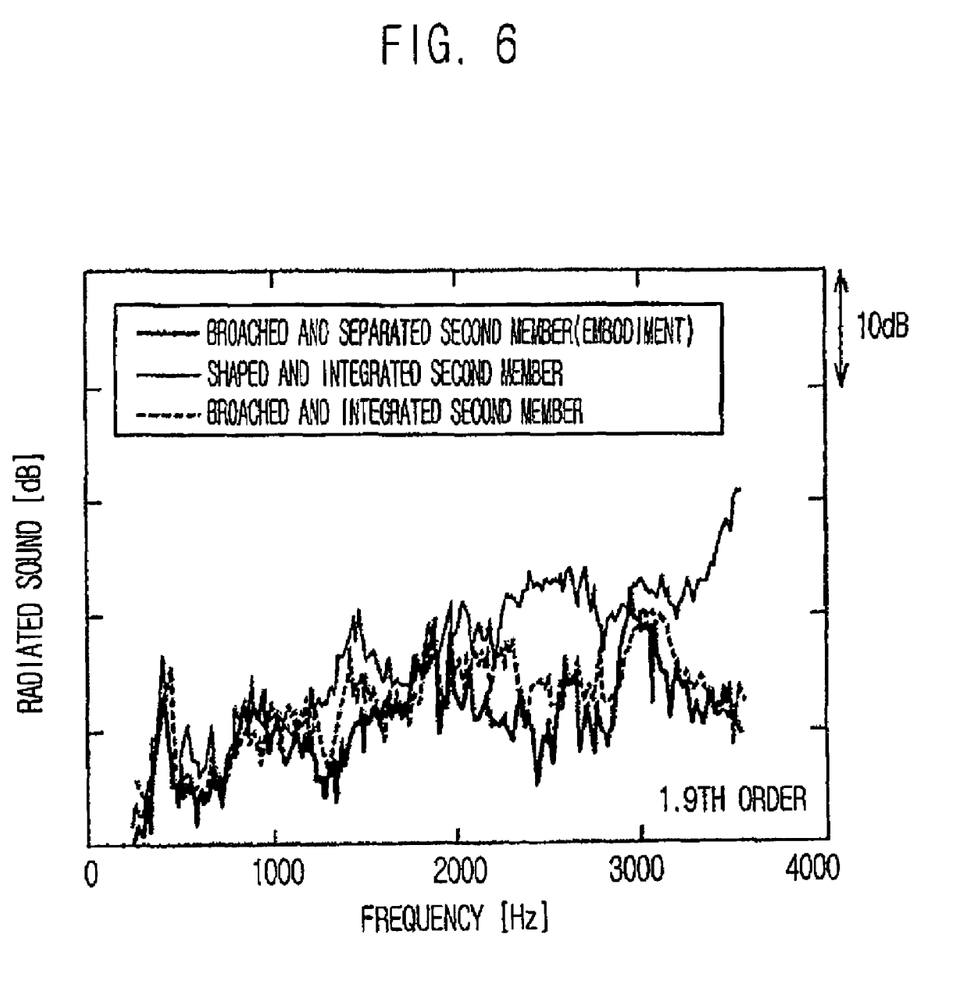
FIG. 6 is another test result of measuring an intensity of radiated sound (vibration noise) by using a microphone when driving a power transmission device.

FIGS. 4 to 6 are test results of measuring the intensities (decibel: dB) of radiated sound (vibration noise) by using a microphone when driving the real power transmission device 10 configured as described above. Also, FIGS. 4 to 6 indicate the influence of engagement frequencies, by classifying the engagement frequencies according to the engagement order, by using a frequency analyzer. The abscissas in FIGS. 4 to 6 indicates the frequency, and the ordinates in FIGS. 4 to 6 indicates the intensity of the radiated sound.

FIG. 4 shows 1st order engagement frequency components, which become fundamental frequency components of the radiated sound. Here, a thick solid line indicates the constitution of this embodiment, in which the second member 46 of the composite gear member 42 is formed in a separate body and spline-coupled to the first member 44 with the clearances shown in FIG. 3, and the internal teeth 58 of the ring gear R2 are formed by broaching (broached and separated second member). The spline teeth 62 and 64 of the first and second members are designed to have the clearances therebetween as described above. A thin solid line indicates the constitution of an object of comparison, in which the composite gear is formed integrally and the internal teeth 58 of the ring gear R2 are formed by shaping (shaped and integrated second member), which has inferior machining accuracy in comparison to broaching. A dashed line indicates a constitution, in which the composite gear is formed integrally, the ring gear R1 of the first planetary gear device 22 is removed so that broaching can be performed, and the internal teeth 58 of the ring gear R2 are formed by broaching (broached and integrated second member). The different types of lines shown in FIGS. 5 and 6 indicate the same test conditions as the lines shown in FIG. 4, respectively.

As shown in FIG. 4, in a region of the frequency over 2000 Hz, compared with the radiated sound of the constitution indicated by the thin solid line (shaped and integrated second member), the intensity of the radiated sound of the constitution of this embodiment (broached and separated second member) becomes smaller. Especially, in the constitution indicated by the thin solid line, the region near the frequency of 3000 Hz becomes a resonant frequency band where the intensity of the radiated sound is the largest, however, a peak thereof can be reduced by spline-coupling the second member 46. In other words, by spline-coupling the second member 46, the vibration generated from the first member 44 and the second member 46 is absorbed or dispersed, and the resonance in the region near the frequency of 3000 Hz, which may be generated in the constitution having the second member shaped as the integral body, is avoided.

FIG. 5 shows the radiated sound of 2nd order engagement frequency components. In the overall frequency band of the 2nd order engagement frequency, compared with the radiated sound of the constitution indicated by the thin solid line (shaped and integrated second member), the intensity of the radiated sound of the constitution of this embodiment indicated by the thick solid line (broached and separated second member) becomes smaller. In FIG. 5, similarly to FIG. 4, by spline-coupling the second member 46, the vibration is absorbed or dispersed, and the resonance is reduced. In addition, an influence of the engagement reaction force generated from the output gear 32 is decreased by the spline-coupling, an aligning function of the second planetary gear device 24 is exhibited, and the vibration is reduced.

FIG. 6 shows the radiated sound of non-integer order engagement frequency components. In FIG. 6, as an example of the non-integer order, the intensities of the radiated sound of 1.9th order engagement frequency components are shown. As shown in FIG. 6, in a region of the frequency over 3000 Hz, compared with the constitution indicated by the thin solid line (shaped and integrated second member), the intensity of the radiated sound of the constitution of this embodiment (broached and separated second member) becomes smaller. When comparing the constitution indicated by the thin solid line (shaped and integrated second member) with the constitution indicated by the dashed line in which the ring gear R1 of the planetary gear device 22 is removed and the ring gear R2 is formed by the broaching (broached and integrated second member), the radiated sound of the constitution indicated by the dashed line (broached and integrated second member) is smaller than that of the constitution indicated by the thin solid line (shaped and integrated second member). In other words, if the manufacturing process of the internal teeth 58 of the ring gear R2 is changed into the broaching from the shaping, the radiated sound can be optimally reduced.

Figure 7:
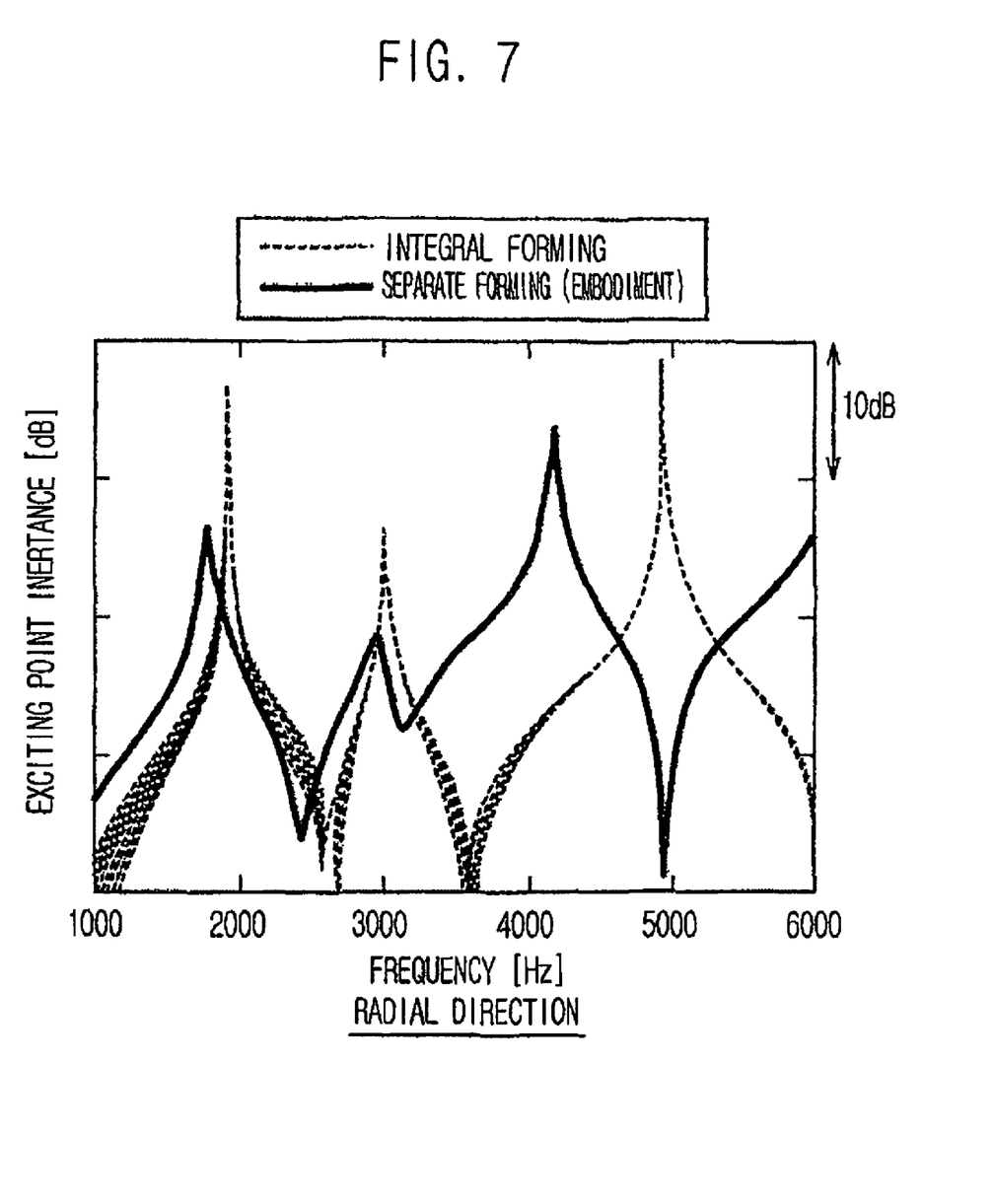
FIG. 7 is a view illustrating a relation between a frequency when excitation vibration of a composite gear member by a vibration exciter and an excitation-point inertance.
Figure 8:
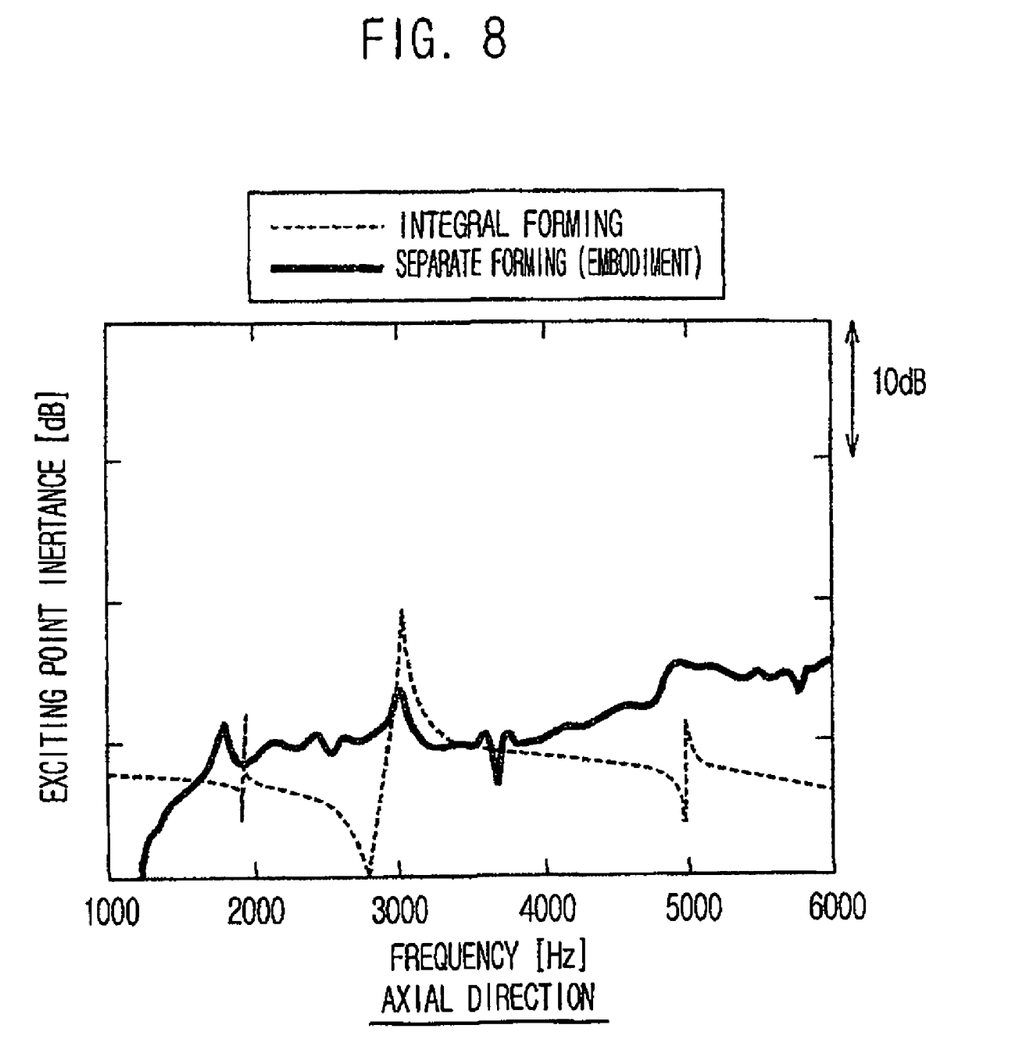
FIG. 8 is a view illustrating another relation between a frequency when excitation vibration of a composite gear member by a vibration exciter and an excitation-point inertance.

FIGS. 7 and 8 show a relation between the frequency when excitation the vibration of the composite gear member 42 by a vibration exciter and an excitation point inertance. FIG. 7 shows excitation of the vibration in the radial direction, and FIG. 8 shows excitation of the vibration in the axial direction. The abscissas in FIGS. 7 and 8 indicate the frequency of the vibration exciter, and the ordinates indicate the excitation point inertance, which means the intensity of the vibration. Also, a dashed line indicates a constitution in which the first member 44 and the second member 46 are integrally formed (integral forming), and a thick solid line indicates the constitution of this embodiment in which the first member 44 and the second member 46 are separately formed (separate forming).

As shown in FIG. 7, in regions near the frequency of 2000 Hz and 3000 Hz, the excitation point inertance of the constitution of this embodiment (separate forming) indicated by the thick solid line becomes smaller than the excitation point inertance of the constitution (integral forming) indicated by the dashed line. If the excitation vibration in the axial direction as shown in FIG. 8, in the region near the frequency of 3000 Hz, the excitation point inertance of the constitution of this embodiment is smaller than the excitation point inertance of the constitution indicated by the dashed line. In other words, by spline-coupling the first member 44 and the second member 46 to each other, the vibration is reduced.

As described above, according to the aforesaid embodiment, because the composite gear member 42 is divided into the annular first member 44, which is formed with the output gear 32, and the second member 46, which is formed with the internal teeth 58 and spline-coupled to the inner portion of the first member 44, the influence of the engagement reaction force generated from the output gear 32 of the first member 44 can be decreased by the spline-coupling, and the vibration can be reduced.

Also, according to the aforesaid embodiment, the spline-coupling is performed in the tooth surface slide coupling state in such a manner that the tooth surfaces 63 of the spline teeth 62 formed at the inner portion of the first member 44 come into contact with the tooth surfaces 65 of the spline teeth 64 formed at the outer peripheral surface of the second member 46, and the sufficient clearances are provided between the tooth tips and the tooth bottoms of the spline teeth 62 and 64. Therefore, the influence of the engagement reaction force generated from the output gear 32 of the first member 44 can be further decreased, and the vibration can be reduced.

Also, according to the aforesaid embodiment, because the first member 44 is provided with the internal teeth 52 to be tooth-engaged with the pinion gear P1 of the first planetary gear device 22 mounted near the second planetary gear device 24 in the axial direction, and the internal teeth 52 have the smaller diameter than the internal teeth 58 formed at the second member 46, the internal teeth 58 of the second member 46 and the internal teeth 52 of the first member 44 can be formed by the broaching which has good machining accuracy and efficiency, and the vibration can be reduced by the increase of the machining accuracy.

Also, according to the aforesaid embodiment, since the output gear 32 is positioned between the internal teeth 52 of the second member 46 and the internal teeth 58 of the first member 44 in the axial direction, the engagement reaction force generated from the output gear 32 is dispersed into the respective planetary gear devices 22 and 24, and the influence of the engagement reaction force from the output gear 32 is decreased.

In the above description, the embodiment of the present invention has been explained in detail with reference to the annexed drawings, however, the present invention can also be applied to the other embodiments.

For example, in the aforesaid embodiment, the spline-coupling is performed only between the second planetary gear device 24 and the composite gear member 42. However, the spline-coupling may be performed between the first planetary gear device 22 and the composite gear member 42, or may be performed between the first and second planetary gear devices 22 and 24 and the planetary gear devices provided to either side of the composite gear member 42.

Also, in the aforesaid embodiment, the present invention is applied to the power transmission device 10 of the hybrid vehicle. However, the present invention may also be applied to the other types of vehicle, e.g., a FR (Front engine•rear drive) type vehicle that uses an engine as a driving power source, in addition to the hybrid vehicle.

Although the embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A power transmission device comprising:
    a composite gear member including internal teeth that engage with pinion gears of a planetary gear device, thereby functioning as a ring gear of the planetary gear device, and external teeth that engage with another gear,
    wherein the composite gear member includes a cylindrical main body that is formed with the external teeth, and an annular member that is formed with the internal teeth and spline-coupled to an inner portion of the main body.

2. The power transmission device according to claim 1, wherein the annular member is spline-coupled to the main body such that tooth surfaces of spline teeth formed on the inner portion of the main body contact tooth surfaces of spline teeth formed on an outer peripheral surface of the annular member.

3. The power transmission device according to claim 2, wherein a large-diameter clearance located at the large-diameter side and a small-diameter clearance located at the small-diameter side in the radial direction are formed between the main body and the annular member.

4. The power transmission device according to claim 1, wherein internal teeth are formed on a portion of the main body and the portion of the main body on which the internal teeth are formed engage with a pinion gear of another planetary gear device which is mounted near the planetary gear device in an axial direction of the main body, and
    wherein the addendum circle of the internal teeth of the main body has a smaller diameter than the addendum circle of the internal teeth formed on the annular member.

5. The power transmission device according to claim 3, wherein the external teeth are positioned between the internal teeth formed on the annular member and the internal teeth formed on the main body in the axial direction of the main body.

6. The power transmission device according to claim 4, wherein the main body includes a small-diameter portion and a large-diameter portion, and
    wherein the annular member is spline-coupled to an inner portion of the large-diameter portion.

7. The power transmission device according to claim 6, wherein the internal teeth engaging with the pinion gear of the another planetary gear device are formed on the small-diameter portion.

8. A power transmission device comprising:
    first and second planetary gear devices, each having one group of pinion gears;
    a common composite gear member including first and second internal teeth that engage with the pinion gears of the first and second planetary gear devices, thereby functioning as ring gears of the first and second planetary gear devices, and external teeth that engage with another gear,
    wherein the composite gear member includes:
        a cylindrical main body that is formed with the external teeth and the first internal teeth that engage with the pinion gear of the first planetary gear device; and
        an annular member that is spline-coupled to an inner portion of the main body, and that is formed with the second internal teeth that engage with the pinion gear of the second planetary gear device.

9. The power transmission device according to claim 8, wherein the external teeth are positioned between the first internal teeth and the second internal teeth in the axial direction of the main body.

10. The power transmission device according to claim 8, wherein the annular member is spline-coupled to the main body such that tooth surfaces of spline teeth formed on the inner portion of the main body contact tooth surfaces of spline teeth formed on an outer peripheral surface of the annular member.

11. The power transmission device according to claim 10, wherein a large-diameter clearance located at the large-diameter side and a small-diameter clearance located at the small-diameter side in the radial direction are formed between the main body and the annular member.

12. The power transmission device according to claim 8, wherein the main body includes a small-diameter portion and a large-diameter portion, and
    wherein the annular member is spline-coupled to an inner portion of the large-diameter portion.

13. The power transmission device according to claim 12, wherein the first internal teeth are formed on the small-diameter portion.

* * * * *